United States Patent
McAfee et al.

(10) Patent No.: US 7,600,157 B2
(45) Date of Patent: *Oct. 6, 2009

(54) RECOVERING FROM A FAILED I/O CONTROLLER IN AN INFORMATION HANDLING SYSTEM

(75) Inventors: Martin McAfee, Lago Vista, TX (US); Bharath Vasudevan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/250,847

(22) Filed: Oct. 14, 2008

(65) Prior Publication Data

US 2009/0037776 A1     Feb. 5, 2009

Related U.S. Application Data

(63) Continuation of application No. 10/349,584, filed on Jan. 23, 2003, now Pat. No. 7,480,831.

(51) Int. Cl.
*G06F 11/00* (2006.01)
(52) U.S. Cl. .................. 714/43; 714/3; 714/5
(58) Field of Classification Search .......... 714/3, 714/5, 43
See application file for complete search history.

(56) References Cited

U.S. PATENT DOCUMENTS

| | | | |
|---|---|---|---|
| 3,654,617 A | 4/1972 | Irwin | |
| 3,768,074 A | 10/1973 | Sharp et al. | |
| 4,321,665 A | 3/1982 | Shen et al. | |
| 4,344,132 A | 8/1982 | Dixon et al. | |
| 4,521,871 A | 6/1985 | Galdun et al. | |
| 5,185,693 A | 2/1993 | Loftis et al. | |
| 5,257,379 A | 10/1993 | Cwiakala et al. | |
| 5,619,644 A | 4/1997 | Crockett et al. | |
| 5,630,045 A | 5/1997 | Krygowski et al. | |
| 5,644,700 A | 7/1997 | Dickson et al. | |
| 5,717,950 A | 2/1998 | Yamaguchi et al. | |
| 5,740,386 A | 4/1998 | Miller et al. | |
| 5,742,792 A | 4/1998 | Yanai et al. | |
| 5,771,387 A | 6/1998 | Young et al. | |
| 5,790,775 A | 8/1998 | Marks et al. | |
| 5,815,647 A | 9/1998 | Buckland et al. | |
| 6,052,795 A | 4/2000 | Murotani et al. | |
| 6,061,754 A | 5/2000 | Cepulis et al. | |
| 6,105,091 A | 8/2000 | Long | |

(Continued)

*Primary Examiner*—Robert Beausoliel
*Assistant Examiner*—Elmira Mehrmanesh
(74) *Attorney, Agent, or Firm*—Haynes and Boone, LLP

(57) ABSTRACT

An information handling system includes first and second input/output (I/O) controllers, a detector for detecting an I/O controller failure, and an I/O recovery unit. The first I/O controller adaptively controls a first and a second I/O slot. The second I/O controller adaptively controls a third and a fourth I/O slot. Lastly, the I/O recovery unit, responsive to a detected I/O controller failure, operatively couples/decouples the first and second I/O slot to/from the first I/O controller, operatively couples/decouples the third and fourth I/O slot to/from the second I/O controller, and operatively decouples/couples the first and second I/O slot from/to the third and fourth I/O slot according to an I/O failure recovery protocol, the I/O failure recovery protocol provided for adapting one of either the first and second I/O controllers to operatively couple to the first, second, third and fourth I/O slots as a function of the detected I/O controller failure.

10 Claims, 5 Drawing Sheets

U.S. PATENT DOCUMENTS

| | | |
|---|---|---|
| 6,134,621 A | 10/2000 | Kelley et al. |
| 6,141,769 A | 10/2000 | Petivan et al. |
| 6,182,178 B1 | 1/2001 | Kelley et al. |
| 6,240,056 B1 | 5/2001 | Tanase et al. |
| 6,263,452 B1 | 7/2001 | Jewett et al. |
| 6,272,529 B1 | 8/2001 | Lum |
| 6,321,346 B1 | 11/2001 | Murotani et al. |
| 6,412,078 B2 | 6/2002 | Murotani et al. |
| 6,425,092 B1 | 7/2002 | Evans et al. |
| 6,490,659 B1 | 12/2002 | McKean et al. |
| 6,578,158 B1 | 6/2003 | Deitz et al. |
| 6,633,946 B1 | 10/2003 | Hendel |
| 6,681,339 B2 | 1/2004 | McKean et al. |
| 6,708,283 B1 | 3/2004 | Nelvin et al. |
| 6,738,818 B1 | 5/2004 | Shah |
| 6,782,438 B1 | 8/2004 | Duncan et al. |
| 6,845,467 B1 | 1/2005 | Ditner et al. |
| 6,918,001 B2 | 7/2005 | Fanning |
| 6,931,567 B2 | 8/2005 | Tanaka et al. |
| 6,954,819 B2 | 10/2005 | Ng |
| 6,978,397 B2 | 12/2005 | Chan |
| 7,000,101 B2 | 2/2006 | Wu et al. |
| 7,003,687 B2 | 2/2006 | Matsunami et al. |
| 7,093,043 B2 | 8/2006 | Tan et al. |
| 7,099,969 B2 | 8/2006 | McAfee et al. |
| 7,103,695 B2 | 9/2006 | Peil et al. |
| 7,293,125 B2 | 11/2007 | McAfee et al. |
| 7,328,290 B2 | 2/2008 | Leigh et al. |
| 2002/0133744 A1 | 9/2002 | Oldfield et al. |
| 2004/0221198 A1 | 11/2004 | Vecoven |
| 2005/0012747 A1 | 1/2005 | Sauber |

RECOVERING FROM A FAILED I/O CONTROLLER IN AN INFORMATION HANDLING SYSTEM

CROSS REFERENCE TO RELATED APPLICATIONS

The present application claims priority to and is a continuation of co-owned co-pending U.S. Utility application Ser. No. 10/349,584, (DC-03882), filed on Jan. 23, 2003, the disclosure which is incorporated herein by reference.

BACKGROUND

The present disclosure relates generally to information handling systems, and more particularly to a method and apparatus for recovering from a failed input/output (I/O) controller in an information handling system (IHS).

As the value and use of information continues to increase, individuals and businesses seek additional ways to process and store information. One option is an IHS. An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

In conjunction with IHSs, there is always a need in the enterprise space to increase an availability of servers. That is, a server should be able to run, with failed components, until a service person is able to correct the problem, rather than being rendered offline.

In one environment, e.g., the Power Edge 8755 server available from Dell Computer of Round Rock, Tex., includes PCI slots located on the server's IO board. The IO board houses two P64H2 PCI bus controllers. If a PCI bus controller fails, then the server will lockup and reboot. Once the server reboots, the failed PCI bus controller will be disabled and any adapters plugged into the slots of the PCI slots will be unable to function. In addition, if the boot device is on the PCI slot connected to the failed PCI bus controller, the server will not boot. Such an occurrence is undesirable.

In the current generation of servers, there are three methods used to combat a PCI controller failure, as discussed below.

1) Adding redundant components to the server system which support failover or adapter teaming can be used to combat a PCI controller failure. However, this approach involves using two of the same PCI adapters connected to the same location in a master-slave configuration coupled with some type of failover or teaming driver. Examples can include redundant NICs, Fibre Channel HBAs, or SCSI RAID controllers. For server offerings sized less than three (3) rack units, there is a finite on the number of PCI slots available in a given system. This lack of adapter space is further magnified by the emergence of blade and brick servers. With this type of space utilization, it becomes difficult to populate two slots for one function. There is just too high a premium on doubling up the number of adapters.

2) Microsoft Cluster Server (MSCS) clustering is another method of recovering from a PCI bus failure. With MSCS clustering, however, an identically configured server is connected to the same storage and held in a passive state until the first server encounters a failure. Once any component of the first server fails, all its operations are taken over by the second server. The primary drawback to this scheme, however, is that keeping a duplicate server for use 'only in the case of an emergency' can be cost prohibitive. A customer ends up paying 2× for 1× the performance. Furthermore, MSCS clustering is only applicable when using direct-attached-storage.

3) Another option is to reboot the server with the failed PCI component disabled. If the boot device or any adapters with connectivity to external media is present on the failed PCI busses, this scheme is rendered useless. Such a method is effective as long as the failed PCI controller didn't house any system-critical devices behind it. If system critical devices are present behind the failed controller, manual reconfiguration of the PCI devices will be necessary to continue worthwhile operations. This highlights the difference between uptime and true high-availability.

FIG. 1 illustrates a block diagram view of an I/O design for an IHS known in the art and susceptible to PCI controller failure as discussed herein. The I/O design 10 includes first and second I/O controllers (12, 14). The first I/O controller 12 controls first and second PCI slots (16, 18). The second I/O controller 14 controls first and second PCI slots (20, 22). The bus speeds of the I/O controllers are controlled via respective I/O bus speed strapping inputs (24, 26).

Accordingly, it would be desirable to provide method and apparatus for booting a server with a failed PCI bus controller, which may or may not have a boot device behind it, absent the disadvantages found in the prior methods discussed above.

SUMMARY

According to one embodiment of the present disclosure, an IHS includes first and second I/O controllers, a detector for detecting an I/O controller failure, and an I/O recovery unit. The first I/O controller adaptively controls a first and a second I/O slot. The second I/O controller adaptively controls a third and a fourth I/O slot. Lastly, the I/O recovery unit, responsive to a detected I/O controller failure, operatively couples/decouples the first and second I/O slot to/from the first I/O controller, operatively couples/decouples the third and fourth I/O slot to/from the second I/O controller, and operatively decouples/couples the first and second I/O slot from/to the third and fourth I/O slot according to an I/O failure recovery protocol, the I/O failure recovery protocol being provided for adapting one of either the first and second I/O controllers to operatively couple to the first, second, third and fourth I/O slots as a function of the detected I/O controller failure. A method of I/O controller failure recovery in an IHS is also disclosed.

DETAILED DESCRIPTION

According to one embodiment of the present disclosure, a method and system apparatus are disclosed for recovering from a failed I/O controller in an IHS. The method and system can be better understood by reference to the flow charts, drawing figures, and additional discussion included herein.

Figure 1:
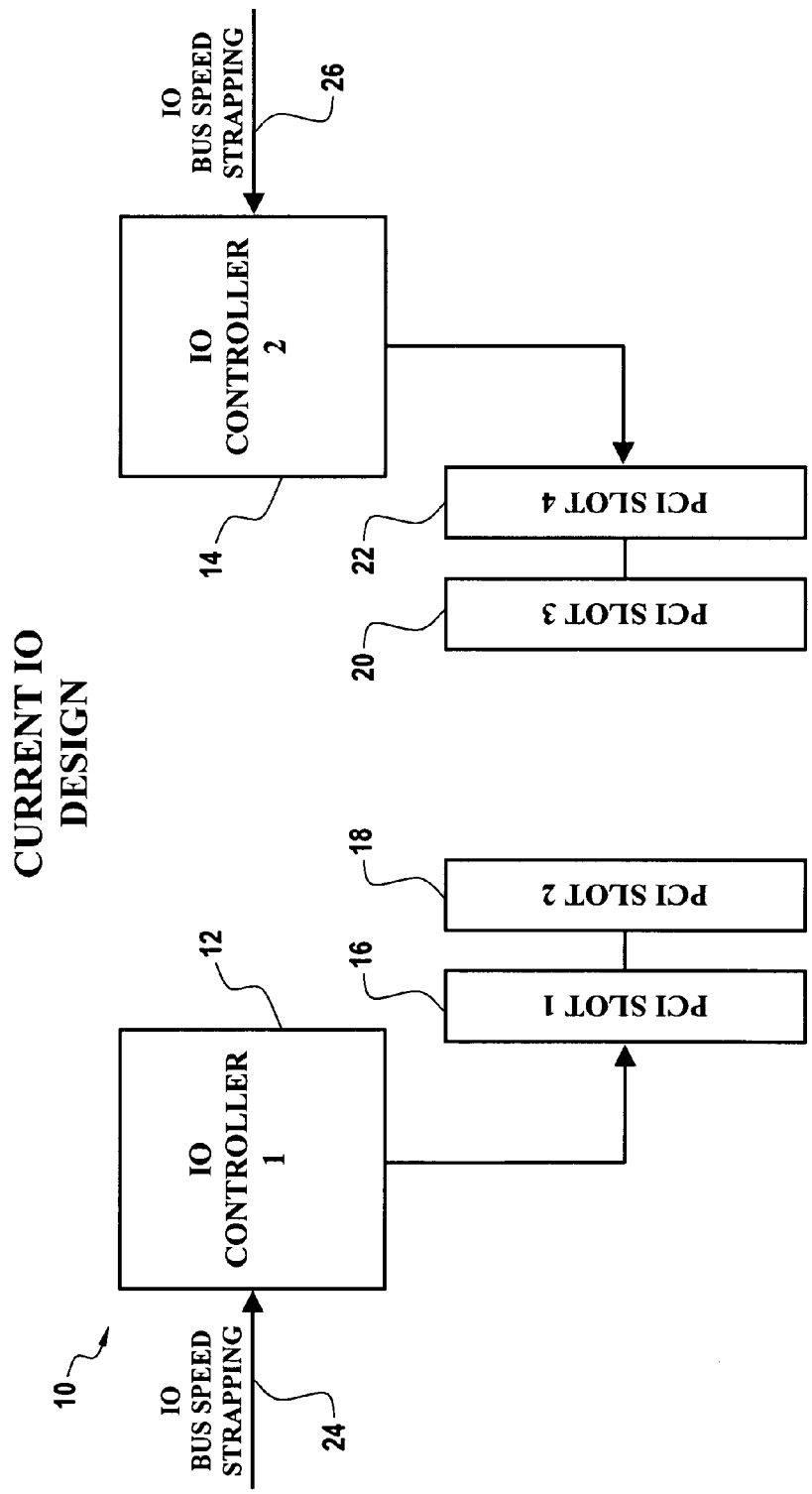
FIG. 1 illustrates a block diagram view of an I/O design for an IHS known in the art.
Figure 2:
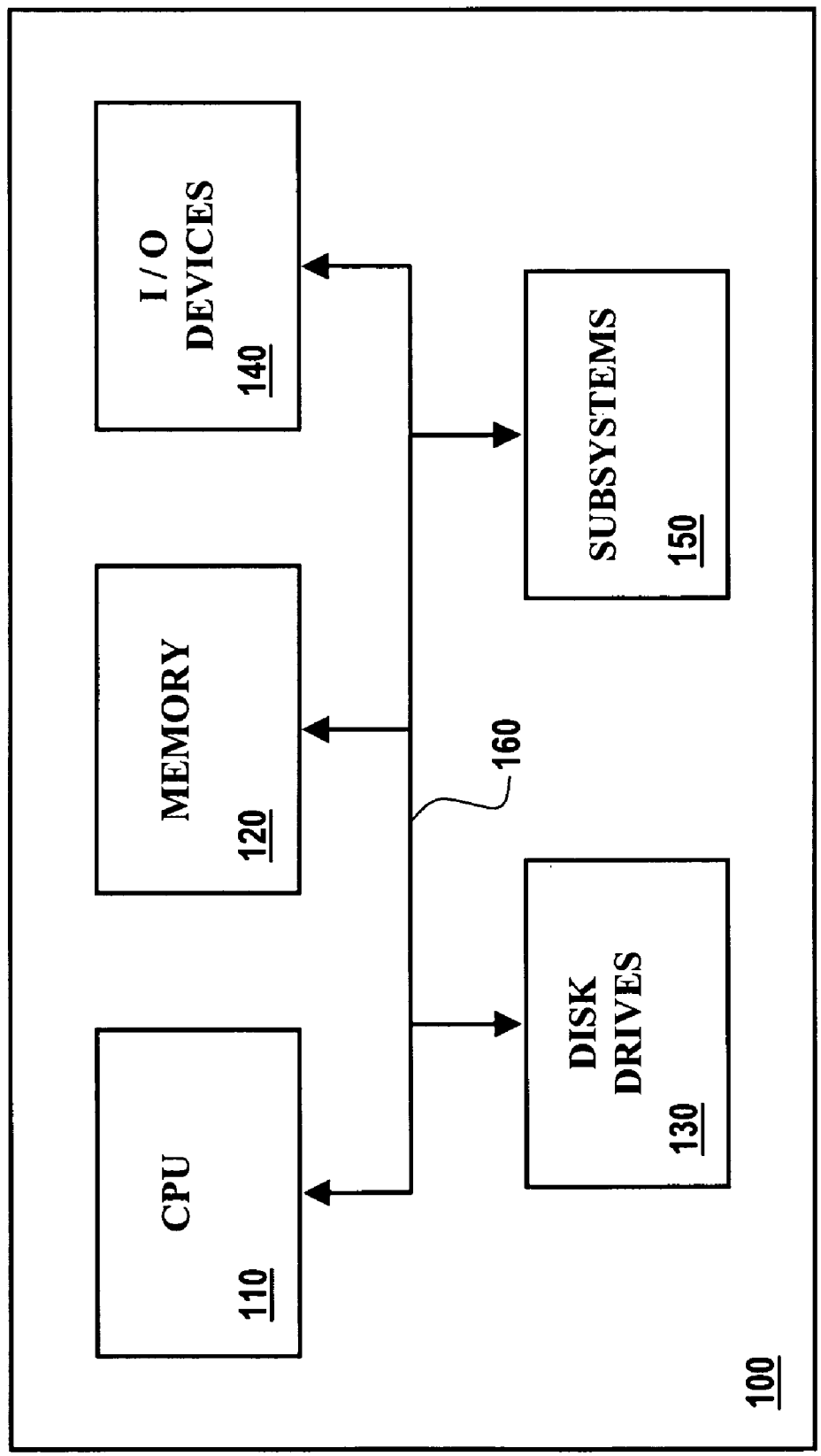
FIG. 2 illustrates a block diagram view of an IHS incorporating a method and apparatus for recovering from a failed PCI controller according to an embodiment of the present disclosure.

FIG. 2 depicts a high level block diagram of an IHS 100 in which the disclosed technology is practiced. For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various I/O devices, such as a keyboard, a mouse, and a video display. The IHS may also include one or more buses operable to transmit communications between the various hardware components.

In particular, the system block diagram of FIG. 2 illustrates an IHS 100 that includes a CPU 110, memory 120, disk drives 130, such as a hard disk drive, a floppy disk drive, a CD-ROM drive, or other storage devices, and I/O devices, such as a display, a keyboard, a mouse, and associated controllers, collectively designated by a reference numeral 140. IHS 100 further includes one or more subsystems, such as a network interface card, PCI controllers and I/O, collectively designated by a reference numeral 150, all interconnected via one or more buses, shown collectively as a bus 160. IHS 100 includes I/O failure recovery as further discussed herein below with respect to FIGS. 3-5.

Figure 3:
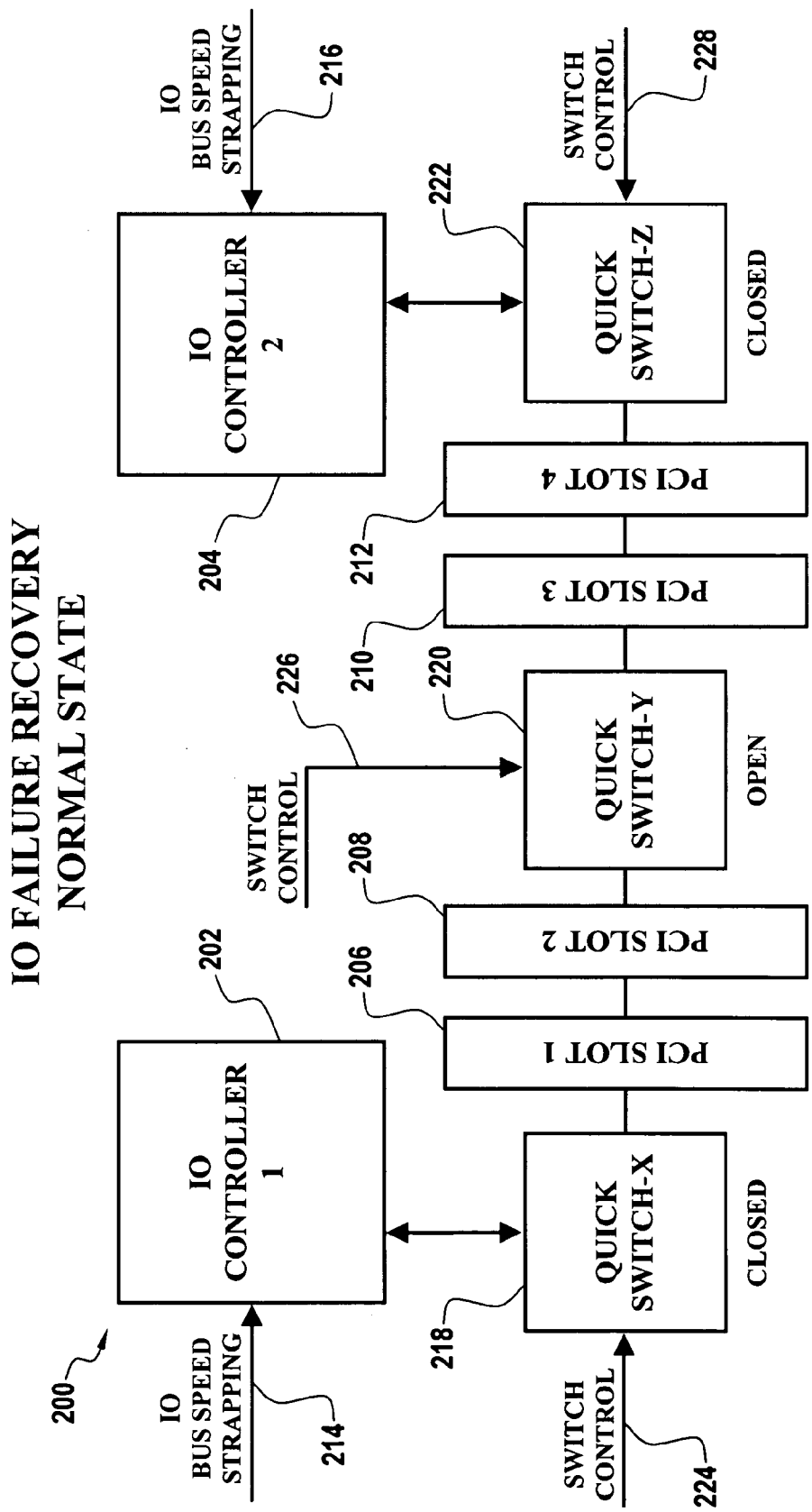
FIG. 3 illustrates a block diagram view of an I/O failure recovery method and apparatus in a normal state according to one embodiment of the present disclosure.

Referring now to FIG. 3, according to one embodiment of the present disclosure, an I/O design with failure recovery, generally indicated by reference numeral 200, includes first and second I/O controllers 202 and 204. The first I/O controller 202 controls first and second PCI slots (206, 208). The second I/O controller 204 controls third and fourth PCI slots (210, 212). The bus speeds of the I/O controllers are controlled via respective I/O bus speed strapping inputs (214, 216). In addition, the I/O design includes a number of quick-switches (218, 220, and 222).

Most PCI or PCI-X controllers function such that they can operate at multiple speeds. A PCI controller may have one to four slots per channel. The speeds currently range from 33 MHz to 133 MHz. In one embodiment of the present disclosure, an IHS server includes 6 PCI-X slots having been architected with two instances each of one PCI-X slot per bus segment operating at speeds up to 133 MHz and two PCI-X slots per bus segment operating at speeds up to 100 MHz. Quick-switches (218, 220, and 222) are coupled between elements on different PCI bus segments, as shown in FIG. 3 and as discussed further herein below. In FIG. 3, only two PCI bus segments are shown for simplicity.

Each quick-switch includes a switch control input, operative to open a respective switch or close the respective switch. Switch control inputs of switches 218, 220 and 222 are identified via reference numerals 224, 226 and 228, respectively. Switch control inputs can include, for example, a GPIO port controlled via a system BIOS or a programmable logic device (PLD).

According to one embodiment, the BIOS and/or firmware of the IHS is configured to reboot the system in response to a failure of an I/O controller. Rebooting of the system causes a power on self test (POST) to be executed. The POST includes executable instructions for an implementing an auto-bus scan. The auto-bus scan scans the I/O buses and switches for learning all permutations of failures and storing the learned permutations in a register. For example, the auto-bus scan may determine that there are two I/O controllers, one controller having one device at 100 MHz and the other controller having four devices at 66 MHz. If the POST routine detects and/or witnesses a failure, then the POST routine executes a particular permutation to recover from the I/O failure in response to a specific occurrence of an I/O controller failure. In particular, the POST instructs the switches to open/close, for example, via a GPIO output or PLD output, as required for the recovery from a given I/O failure, further as discussed herein with respect to FIGS. 3-5.

With reference again to FIG. 3, in operation, in a first state, switch control input 224 operates to place quick-switch 218 in an opened state. Responsive to being placed in the opened state, quick-switch 218 decouples the IO controller 202 from IO slots 206 and 208. In a second state, switch control input 224 operates to place quick-switch 218 in a closed state. Responsive to being placed in the closed state, quick-switch 218 couples the IO controller 202 to IO slots 206 and 208. In a similar manner, quick-switch 220 operates to couple/decouple IO slots 206, 208 to/from IO slots 210, 212 in response to a switch control input on input 226. Furthermore, quick-switch 222 operates to couple/decouple IO controller 204 to/from IO slots 210, 212 in response to a switch control input on input 228.

Referring still to FIG. 3, the block diagram view illustrates the I/O failure recovery method in a normal state according to one embodiment of the present disclosure. In particular, in the normal state, IO controllers 202 and 204 are both operational and operating with a respective I/O bus speed in response to corresponding I/O bus speed strapping inputs 214 and 216, respectively. Quick-switches 218 and 222 are each placed in a closed position in response to respective switch control inputs 224 and 228. In addition, quick-switch 220 is placed in an open position in response to switch control input 226. Accordingly, I/O controller 202 is operatively coupled to I/O slots 206 and 208. Similarly, I/O controller 204 is operatively coupled to I/O slots 210 and 212. Lastly, I/O slots 206 and 208 are not operatively coupled to I/O slots 210 and 212 in the normal state of operation.

Figure 4:
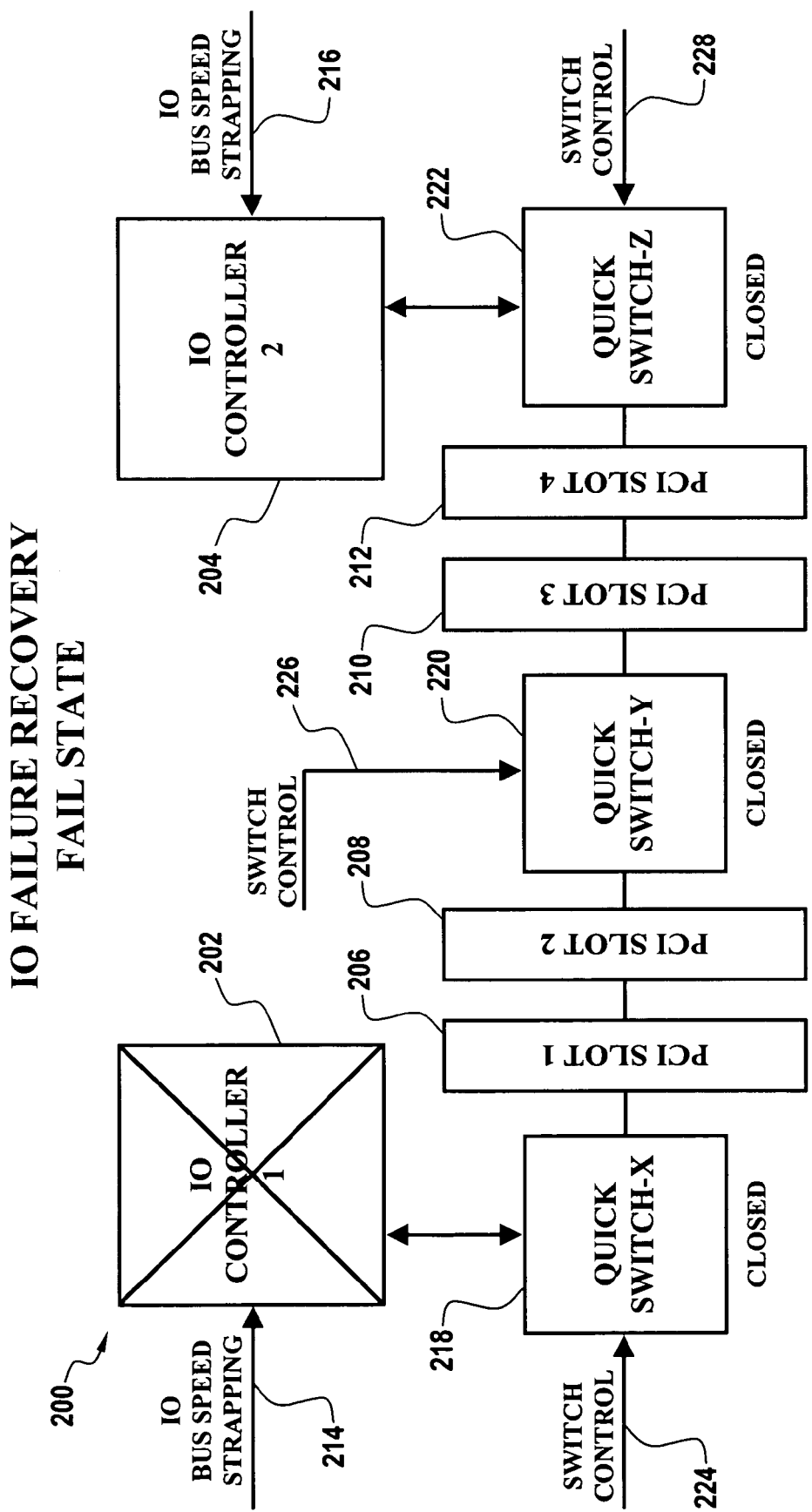
FIG. 4 illustrates a block diagram view of the I/O failure recovery method and apparatus in a fail state according to one embodiment of the present disclosure.

Referring now to FIG. 4, the block diagram view illustrates the I/O failure recovery method in a failed state according to one embodiment of the present disclosure. In particular, in the failed state, assume that IO controller 202 has failed and IO controller 204 is operational. As will be explained further in connection with FIG. 5, the various elements are placed in the following states. Quick-switch 218 is placed in an open position in response to a switch control input 224. Quick-switch 222 is placed in a closed position in response to switch control input 228. In addition, quick-switch 220 is placed in a closed position in response to switch control input 226. Accordingly, I/O controller 202 is operatively decoupled from I/O slots 206 and 208. I/O controller 204 is operatively coupled to I/O slots 210 and 212, in addition to being operatively coupled to I/O slots 206 and 208 via quick-switch 220. In other words, I/O slots 206 and 208 are operatively coupled to I/O slots 210 and 212 in the failed state of this example. In addition, the I/O bus speed is controlled in response to a corresponding I/O bus speed strapping input 216 of I/O controller 204.

Further in connection with FIG. 4, steps to recover I/O slots 206 and 208 after an I/O controller failure of I/O controller 202 include rebooting the system. Quick switch 218 is turned off. Quick switch 220 is turned on. A lowest I/O bus speed for the PCI slots is selected, via a GPIO controlled by a system BIOS or a PLD. Lastly, I/O controller 204 operatively couples with I/O slots 210, 212 and slots 206, 208 via quick switches 222 and 220, respectively.

Figure 5:
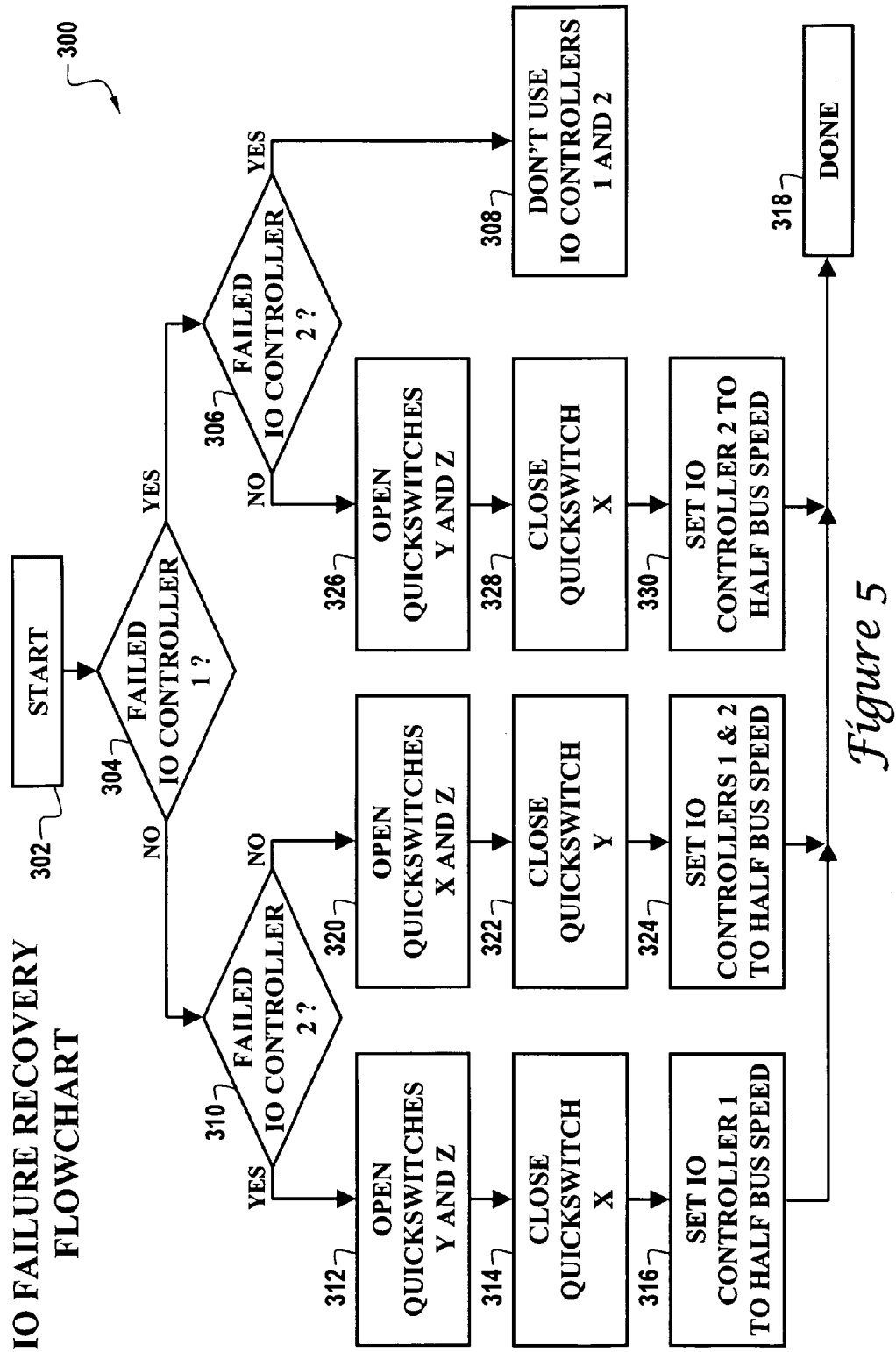
FIG. 5 shows a flow chart of the I/O failure recovery according to one embodiment of the present disclosure.

Turning now to FIG. 5, the method of I/O failure recovery according to one embodiment of the present disclosure will be further discussed in connection with the flowchart 300. The I/O failure recovery process begins at 302 and proceeds to step 304. At step 304, a query is made as to whether I/O controller 1 (202) has failed. If I/O controller 1 has failed, then the process proceeds to step 306. At step 306, a query is made as to whether I/O controller 2 (204) has failed. If I/O controller 2 has failed, then the process proceeds to step 308, where neither of I/O controller 1 or 2 are operational, and the process ends.

Returning to step 304, if I/O controller 1 has not failed, then the process proceeds to step 310. At step 310, a query is made as to whether I/O controller 2 (204) has failed. If, at step 310, I/O controller 2 has failed, then the process proceeds to step 312. At step 312, quick-switch 222 is controlled by switch input 228 to be in an opened state. Next, at step 314, quick-switches 218 and 220 are controlled by respective switch inputs 224, 226 to be in a closed state. Next, at step 316, I/O controller 1 (202) is controlled by I/O bus speed strapping input 214 to be at a half bus speed. The process then ends at step 318.

Returning again to step 310, if I/O controller 2 has not failed, then the process proceeds to step 320. At step 320, quick-switches 218 and 222 are controlled by switch inputs 224 and 228, respectively, to be in a closed state. Next, at step 322, quick-switch 220 is controlled by switch input 226 to be in an opened state. Next, at step 324, I/O controller 1 (202) and I/O controller 2 (204) are controlled by respective I/O bus speed strapping inputs 214 and 216 to be at a full bus speed. The process then ends at step 318.

Returning again to step 306, if I/O controller 2 (204) has not failed, then the process proceeds to step 326. At step 326, quick-switch 218 is controlled by switch input 224 to be in an opened state. Next, at step 328, quick-switches 220 and 222 are controlled by respective switch inputs 226, 228 to be in a closed state. Next, at step 330, I/O controller 2 (204) is controlled by I/O bus speed strapping input 216 to be at a half bus speed. The process then ends at step 318.

In response to a failure of a PCI controller, the IHS performs a reboot. At the time of the system reboot, the quick switches actuate as discussed herein. In addition, the failed controller's PCI devices (i.e., connected via corresponding I/O slots) are controlled by the surviving PCI controller present in the system. For example, the failed controller's PCI devices can be controlled by the surviving PCI controller according to the I/O failure recovery process as discussed in connection with the flowchart 300 of FIG. 5.

With one embodiment of the present disclosure, the new PCI bus configuration operates at non-optimal speeds. In addition, while the overall system is placed in a critically degraded state, any problem of losing system critical resources is resolved.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system (IHS) comprising:
a first input/output (I/O) controller adapted to control a first and a second I/O slot in a normal operation state;
a second I/O controller adapted to control a third and a fourth I/O slot in a normal operation state;
means including a power on self test (POST) routine for detecting an I/O controller failure;
switching means, responsive to a detected I/O controller failure, for operatively coupling/decoupling the first and second I/O slot to/from the first I/O controller, for operatively coupling/decoupling the third and fourth I/O slot to/from the second I/O controller, and for operatively decoupling/coupling the first and second I/O slot from/to the third and fourth I/O slot according to an I/O failure recovery protocol, the I/O failure recovery protocol being provided for adapting one of either the first and second I/O controllers to operatively couple to the first, second, third and fourth I/O slots as a function of the detected I/O controller failure, wherein the first and second I/O controllers include PCI controllers and the first, second, third, and fourth I/O slots each include a PCI slot;
the switching means provided to couple the first, second, third, and fourth I/O slots to one of the first and the second I/O controllers; and
one of the first and second I/O controllers provided to control the first, second, third, and fourth I/O slots, wherein the one of the first and second I/O controllers is set to half bus speed.

2. The IHS of claim 1, wherein said first I/O controller includes an I/O bus speed strapping input configured to control a bus speed of a first I/O bus, wherein said second I/O controller includes an I/O bus speed strapping input configured to control a bus speed of a second I/O bus, and wherein the I/O failure recovery protocol further operates to control the I/O bus speed of the first, second, third and fourth I/O slots as a function of the detected I/O controller failure and one of the I/O bus speed strapping inputs of said first and second I/O controllers.

3. The IHS of claim 1, wherein the POST routine includes executable code for an implementing an auto-bus scan, the auto-bus scan being provided for scanning the I/O controllers and switches to learn all permutations of failures and store the learned permutations.

4. The IHS of claim 3, wherein responsive to a detection of an I/O controller failure, the POST routine executes a permutation to recover from the I/O controller failure.

5. The IHS of claim 4, wherein said means for operatively coupling/decoupling the first and second I/O slot to/from said first I/O controller, for operatively coupling/decoupling the third and fourth I/O slot to/from said second I/O controller, and for operatively decoupling/coupling the first and second I/O slot from/to the third and fourth I/O slot according to an I/O failure recovery protocol includes first, second and third switches, respectively.

6. The IHS of claim 5, further wherein the POST routine instructs the first, second, and third switches to open/close via at least one selected from the group consisting of a GPIO output and a PLD output.

7. The IHS of claim 1, wherein said means for operatively coupling/decoupling the first and second I/O slot to/from said first I/O controller, for operatively coupling/decoupling the third and fourth I/O slot to/from said second I/O controller, and for operatively decoupling/coupling the first and second I/O slot from/to the third and fourth I/O slot according to an I/O failure recovery protocol includes first, second and third switches, respectively.

8. The IHS of claim 7, wherein the first switch includes a switch control input, wherein responsive to a first input, the first switch operates to couple the first and second I/O slot to said first I/O controller and wherein responsive to a second input, the first switch operates to decouple the first and second I/O slot from said first I/O controller.

9. The IHS of claim 7, wherein the second switch includes a switch control input, wherein responsive to a first input, the second switch operates to couple the third and fourth I/O slot to said second I/O controller and wherein responsive to a second input, the second switch operates to decouple the third and fourth I/O slot from said first I/O controller.

10. The IHS of claim 7, wherein the third switch includes a switch control input, wherein responsive to a first input, the third switch operates to decouple the first and second I/O slots from the third and fourth I/O slots and wherein responsive to a second input, the third switch operates to couple the first and second I/O slots to the third and fourth I/O slots.

* * * * *